United States Patent [19]

Steenken

[11] Patent Number: 4,457,900

[45] Date of Patent: Jul. 3, 1984

[54] SILICIC ACID FOR THE FILTRATION OF BEVERAGES, PARTICULARLY BEER

[75] Inventor: Gerhard Steenken, Berzbuir bei Duren, Fed. Rep. of Germany

[73] Assignee: Akzona Incorporated, Asheville, N.C.

[21] Appl. No.: 373,476

[22] Filed: Apr. 30, 1982

[51] Int. Cl.³ .................. C01B 33/12; B01D 39/14
[52] U.S. Cl. ................... 423/339; 423/325; 423/335; 210/502.1; 502/409
[58] Field of Search ............ 423/333, 339, 325, 335; 210/500.1, 502.1; 252/451; 502/409

[56] References Cited

U.S. PATENT DOCUMENTS

| | | |
|---|---|---|
| 3,928,541 | 12/1975 | Wason .................. 423/339 |
| 3,954,944 | 5/1976 | Aldcroft et al. .......... 423/335 |
| 4,038,098 | 7/1977 | Wason .................. 423/335 X |

FOREIGN PATENT DOCUMENTS

| | | | |
|---|---|---|---|
| 1115724 | 10/1961 | Fed. Rep. of Germany ...... 423/335 |
| 745890 | 3/1956 | United Kingdom ........... 423/335 |
| 1141176 | 1/1969 | United Kingdom ........... 423/339 |

OTHER PUBLICATIONS

"Chemical Engineering", vol. 68, #6, Mar. 20, 1961, Author: T. M. Jackson, pp. 141–146.

Chemische Fabrik Hoesch KG Dueren, "Determination of the Specific Surface Permeability; Method Pursuant to Carman," pub. Jun. 1964.

Primary Examiner—John Doll
Assistant Examiner—Steven Capella
Attorney, Agent, or Firm—Francis W. Young; Jack H. Hall; Daniel N. Christus

[57] ABSTRACT

A finely divided silicic acid simultaneously suitable as a filtering auxiliary and as a beer stabilizing agent in the filtration of beer. The acid is particulate, and the particles are of an essentially spherical or spheroidal shape with $SiO_2$ content of at least 95% and an $Na_2O$ content of less than 0.25%.

5 Claims, 1 Drawing Figure

SILICIC ACID FOR THE FILTRATION OF BEVERAGES, PARTICULARLY BEER

BACKGROUND OF THE INVENTION

The invention relates to the preparation and use of artificially prepared, finely divided silicic acids made by wet precipitation and which are simultaneously suitable as filtering auxiliaries and as beer stabilizers in the filtration of beer.

Finely divided silicic acids of natural origin as well as finely divided silicic acids prepared by synthetic means have long been known.

Silicic acids are used in various industries, e.g. as fillers for natural and synthetic rubber, as pigments in paints, in the manufacture of pharmaceutical and cosmetic powders, as substrates for catalysts, and as filtering auxiliaries or stabilizers in the manufacture of beer as indicated in East German Pat. No. 54 671 and in "The Use of Silica Hydrogels for Combined Filtration and Stabilisation," by Clark et al., in *The Brewer*, June 1980, pp. 168–171.

Users of silicic acid have varying requirements. A silicic acid with a certain set of characteristics is desirable for each special area of use, and certain characteristics of a silicic acid may be advantageous for one intended use but greatly disadvantageous for another intended use. It follows that silicic acid in one of its forms which is a good filler for elastomers cannot be assumed to be suitable in that same form as a filtering auxiliary or stabilizing agent in the manufacture of beer. Each of the known silicic acid manufacturing processes result in silicic acids which can be used advantageously in specific and limited areas of application.

In the filtration of beer, the known synthetic silicic acids made by wet precipitation and suitable as fillers exhibit a series of disadvantages. In their initial state, they are too finely divided. Their mechanical stability is inadequate, so that during filtration according to the settling process the silicic acid is broken down by metering equipment such as pumps and agitators into still finer particles, and the filter becomes clogged within a very short time.

Alternatively, the beer may be simultaneously freed of turbidity in a continuous contact process by filtration with hydrogels rather than filtering auxiliaries, and stabilized by albumin adsorption. The hydrogel, which acts as a filtering auxiliary and adsorbent, may be overburdened by adsorbed albumin and turbidity and after a short time a very high pressure difference may be noted between the filter inlet and outlet indicating filter clogging. In addition, excessive albumin adsorption adversely influences beer quality. Although a number of filter kieselguhrs and some synthetically prepared silicic acids are known as being suitable for beer filtration, there is still a need for an improved, synthetically prepared silicic acid which does not exhibit the disadvantages described above and for processes for its preparation.

SUMMARY OF THE INVENTION

An object of the invention is thus a synthetic, finely divided silicic acid made by wet precipitation which permits the simultaneous filtration and cold stabilization of beer in a continuous contact process, and which does not overburden the filtering auxiliary nor impair beer quality, such as flavor and ability to form and maintain a foam, by excessive albumin adsorption. It is a further goal of the invention to provide silicic acid having a mechanically stable structure, a favorable particle size distribution and a good clarifying effect, and which permits a high quantity output for a given filter size as measured, for example, in hectoliters/m² hr., and which furthermore permits a complete or nearly complete substitution of the acid for filter guhrs. It is a further goal of the invention to provide a process for the advantageous preparation of the present finely divided silicic acid. These goals are obtained with a finely divided silicic acid, suitable simultaneously as a filtering auxiliary and as a beer stabilizer in beer filtration, characterized by silicic acid particles with an essentially spherical or spheroidal shape, an $SiO_2$ content of at least 95% by weight, referred to the solid silicic acid dried at 110° C., an $Na_2O$ content of less than 0.25% by weight, a pH value measured in a 10% suspension in water of about 4 to 7, a surface according to Carman of not more than 100 m²/g, a standard test filtration time $t_o$, as defined below, of 20 seconds to 6 minutes, and a ratio of $$t\frac{1000}{120}/t_o$$

from about 0.7 to 6.5, whereby $$t\frac{1000}{120}$$

is the test filtration time after a stirring stress of 120 minutes at 1000 rpm.

Preferably, the finely divided silicic acid has an $SiO_2$ content of at least 99% by weight. A preferred ratio of $$t\frac{1000}{120}/t_o$$

is about 1.0 to 4.0. A most preferred test filtration time $$t\frac{1000}{120}$$

is 10 minutes or less. The surface according to Carman of the finely divided silicic acid is preferably no greater than 80 m²/g. An advantageous standard test filtration time $t_o$ of the finely divided silicic acid is from about 30 to 150 seconds. Favorable BET surfaces of the finely divided silicic acid are between about 15 to 350 m²/g, and preferably between 40 and 60 m²/g. In an especially advantageous aspect of the invention, the silicic acid has a particle size distribution, as determined with a set of ultrasound wet screens pursuant to the Seitz method of screen analysis, with a residue of at least 60% with a hole size of 40μ, a residue of about 15 to 30% with a hole size of 15μ, a residue of about 1–5% with a hole size of 5μ and an ultra-fine constituent below 5μ of no greater than 5%.

A process for the preparation of the present finely divided silicic acid uses an aqueous charge containing 0.4 to 2.0 weight percent dissolved common salt. The volume of the charge is between 33% and 70% of the final volume of the charge and silicic acid after precipitation of the latter. Uniformly and separately, sodium silicate solution and acid are metered into the charge so as to maintain its pH value between about 3 and 10, while maintaining a temperature between about 50° C. and 95° C. The pH value of the resulting silicic acid suspension is adjusted to about 7 to 4 after all sodium silicate solution and acid have been added, and the resulting silicic acid is filtered out. The filter cake is washed with water and immediately dried so as to avoid elevated shear stresses, followed by screening of the mass after drying with the aid of a sieving device. Preferably, the volume of the charge is at least 50% of the final volume after precipitation has been carried out. Sulfuric acid is very well suited as the acid for precipitation. Brush passing screens may be used for screening, and a mesh width of 1 to 2 mm in the screens is advantageous. Sieving equipment includes those devices known as screening aids, which are used for the sieving, tolerating, or breaking up of suitable products. Suitable sieving equipment is, for example, described in the pamphlet of the firm Allgaier-Werke G.m.b.H., D-7336, Uhingen/-Wuerttemberg, entitled "Tumble Screening Machines" page 3, prospectus No. AVA 4510/579/3000 D.

The standard test filtration time is determined as per the following method: Required are a single-layer filter manufactured by SEITZ-Filterwerke Theo & Geo Seitz, D-6550 Bad Kreuznach; compressed air; a manometer with exact scale divisions; filter paper Mn 615 with a diameter of 15 cm, as manufactured by Macharei & Nagel, Werkstrasse 6, 5160 Dueren, or a filter paper of equivalent quality; a 2-liter measuring beaker; a 2-liter measuring cylinder; and a stopwatch.

DESCRIPTION OF THE PREFERRED EMBODIMENTS

Figure 1:
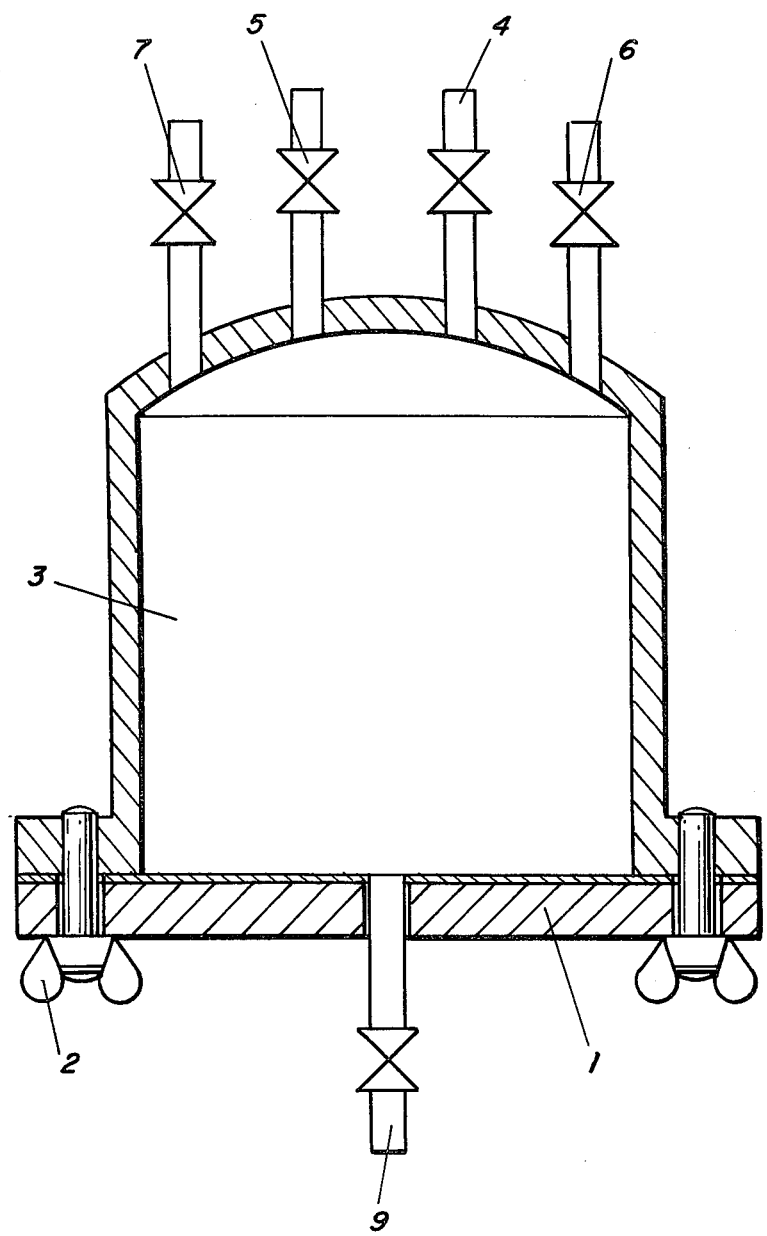

The procedure may be better understood by referring to FIG. 1.

For measuring purposes, the filtration device is vertically positioned and is preferably held on a stand. The bottom (1) of the filter is first loosened by opening the six hinged bolts (2) and then removed. The filter paper is placed in the filter bottom in such a way that the smooth side of the paper is towards the screen plate and the screen side of the paper (rough side) is up. The filter is assembled by tightening opposite pairs of wing nuts simultaneously and uniformly. After the filtration device has been filled and closed, it may be placed under a constant excess pressure of 0.5 bar by means of compressed air from a steel bottle or by means of a compressor with reducing valve and manometer through gas cock (6). The pressure must first be set at 0.5 bar excess pressure with the gas cock (6) closed. 40 g. of filtering auxiliary are stirred into 2 liters of tap water in the measuring beaker with gas cock (7) open, and this solution is transferred to filling space (3) through filler opening (4). Filler opening (4) and gas cock (7) are then closed. When gas cock (6) is opened, the stopwatch is started and the filtration device is put under pressure. During filtration, the excess pressure of 0.5 bar must be held constant. If there should be fluctuations in pressure, they must be compensated for by readjusting the reducing valve (5). Towards the end of filtration, draining of the filtrate becomes irregular. Shortly thereafter, when gas escaping through the drain (9) makes a distinct sound, the stopwatch is stopped. The indicated time is the standard test filtration time, $t_o$. The test filtration time $$t\frac{1000}{120}$$

is determined by the same method and with the same measuring equipment as the standard test filtration time $t_o$. The kieselguhr or filtering auxiliary for which $$t\frac{1000}{120}$$

is to be determined is similarly prepared in that 40 grams are suspended in 2 liters of water. However in contrast with the determination of $t_o$, in which the kieselguhr or silicic acids are tested as supplied, the solution is subjected to a shearing stress by stirring for 120 minutes at 1000 rpm. The ratio $$t\frac{1000}{120}/t_o$$

is a measure of the stability of the filtering auxiliary, and provides an indication as to the extent the filtering agent is changed by shearing stresses during filtration. When $$t\frac{1000}{120}$$

is greater than $t_o$, the silicic acid particles have been even more strongly comminuted upon subjection to shearing stress and the filtering auxiliary has become more pulverulent. When $$t\frac{1000}{120}$$

is less than $t_o$, the smaller particles have been agglomerated into or adsorbed by larger ones.

The shearing stress for the determination of the $$t\frac{1000}{120}$$

value is applied in the following manner: 2 liters of water and 40 g. of filtering auxiliary are filled into a two liter measuring beaker having a lower diameter of 12 cm, an upper diameter of 14 cm, and a height of 16 cm. A stirrer with 4 vanes, each having a 2 cm length and being downwardly inclined 25° relative to the horizontal plane, is lowered into the vessel to a depth of 8 cm and then operated for 120 minutes at 1000 rpm. The test filtration is performed immediately afterwards.

Determination of the particle size distribution according to Seitz is described in greater detail in a paper by Schoeffel and Schaefer, entitled "Experiments for the Characterization of Kieselguhrs" in *Brauwelt No. 18*, May 1, 1980. In this procedure, thin sheets of metal are used as screens, having rectangular holes of 5, 15, or 40µ formed in a galvanic process. Such screens permit a more accurate determination than woven screens, which exhibit a considerably wider statistical scatter of mesh widths. The process for the preparation of the finely divided silicic acids pursuant to the invention can, for example, be carried out as follows: A charge is prepared by dissolving sodium chloride in water of at least drinking quality. The common salt should be at a concentration of from about 0.4 to 2% by weight. The volume of the charge is from 33% to 70% of the final volume of the silicic acid suspension present after the complete addition of sodium silicate solution and acid, the surface area of the resulting silicic acid varying with the charge volume. In general, declining initial salt concentration in solution results in larger surfaces; an increase in common salt concentration for a given amount of the charge results in a coarser grain and smaller BET and Carman surfaces.

At the beginning of metering, the pH value of the charge should be between 3 and 10, preferably between 5 and 10. This value is checked during the separate addition of sodium silicate and acid, and held within the indicated or preferred limits. The temperature is regulated so that it is maintained between about 50° and 95° C. After addition of all of the acid and sodium silicate solution, the pH value is adjusted if necessary to between 7 and 4. It is expedient to filter the silicic acid suspension with the aid of filter presses. In this way, and by the method of precipitation set forth above, the resulting silicic acid has a relatively high solids content, an advantage that becomes important during subsequent drying.

The filtered silicic acid is washed with water in the usual manner; the solid substance content of the resulting filter cake is about 25 to 50%. The silicic acid is immediately dried, taking care to avoid the elevated shearing stresses which may result, for example, from transporting the material by means of screw conveyors or by exposing the material to other strong mechanical forces prior to drying. A suitable means for avoiding such stresses is to place the silicic acid from the filter press directly onto a conveyor belt for transport to and through the drying oven. A conveyor belt prevents the additional shearing forces which may result from vibration or the pressure of the acid's own weight during intermediate storage. After leaving the drying oven, the dried material is subjected to a screening step. The screens used function in the manner of straining screens, and a brush screening machine is especially favorable. It is especially surprising that the silicic acids prepared in this manner can be screened without problems and will pass through the screen in the desired fineness and particle size distribution. There is thus no need to grind the dried silicic acid.

An ordinary sodium silicate solution in concentrations of, for example, 8 to 27% can be used for metering. An acid, preferably sulfuric acid at a concentration of 2N to 6N, is used for neutralization or precipitation. The sodium silicate solution and the acid should be added with stirring, and preferably about 95% of their total quantities are metered over about 2 hours. The pH value is then preferably lowered to 4 or 5 by the addition of the remaining quantity of sodium silicate and acid. Stirring is continued for 15 to 30 minutes, and the suspension then filtered at once.

The concentration of silicic acid, calculated as $SiO_2$, in the final volume of the suspension can be varied wihin relatively wide limits; favorable concentrations are, for example, 70 to 95 g of $SiO_2$/liter suspension. Customarily used filter presses are suitable for filtration. It is especially surprising that the present invention comprises finely divided silicic acid which can be used as both a filtering auxiliary and a stabilizing agent during the filtration of beer. Further, the prior art indicated that the adsorption of albumin required surfaces of 350 to 800 $m^2/g$ and a high grinding fineness, that is, at least 99% of the particles were required to have a maximum grain diameter of $40\mu$.

The desired particle size distribution is achieved by means of the precipitating procedure and simple screening of the dried mass; grinding of the dried mass is neither required nor desirable. The present silicic acid can also be processed in an ideal manner together with kieselguhr and is furthermore especially well suited as a complete or partial substitute for coarse to medium fine kieselguhrs. In contrast to kieselguhr, the present silicic acid can be prepared with consistent quality, is free from iron, does not contain any crystalline material such as quartz, is non-injurious to the lungs, and in contrast with naturally occurring kieselguhr, does not have characteristics that vary from origin to origin and shipment to shipment.

The silicic acid pursuant to the invention is mechanically very stable; it can be used without problems upon metering and during 1st and 2nd settling. Due to its outstanding surface structure, the material has very good clarifying characteristics and filtrate quantity yield, and is therefore excellently suited for the simultaneous filtration and stabilization of beer in a continuous contact process. There is no undesirable adsorption of beer components.

The silicic acid pursuant to the invention permits long filter running times; the cake structure is excellent and the intermediate grain volume, which is significantly related to the clarifying characteristics and the filter running time, is very favorable. The invention is explained in greater detail in the following examples, which are illustrative of the invention but not limiting.

EXAMPLE 1

160 grams of common salt were dissolved in a charge of 8 liters of tap water and the resulting solution heated to 60° C. While stirring, 3.75 liters of sodium silicate with 27% by weight of $SiO_2$ per liter and a molar ratio of $Na_2O$ to $SiO_2$ of 1:3.3, as well as dilute sulfuric acid (made of 417 ml of 95% $H_2SO_4$ and 2.09 liters of water) were added separately over 2 hours and at a pH of 10.

A final pH of 5 was obtained by adding about 100 ml of the same dilute sulfuric acid. Stirring was continued for about 15 minutes so as to maintain the pH at 5. This was followed by filtering and washing with water. The solid substance content of the product on the suction filter was 35.2% by weight. The product was transported and dried so as to avoid shearing forces and contained 0.5% total electrolyte. The Carman surface was 31 $m^2/g$., the BET surface 232 $m^2/g$, $t_o$ was 85 sec., and $$t\frac{1000}{120}$$

was 332 sec. A value of $$t\frac{1000}{120}/t_o$$

of 3.73 can be calculated therefrom.

EXAMPLE 2

Silicic acid was prepared in the manner set forth above with a charge of 8 liters of water, 80 grams of common salt, 3.8 liters of sodium silicate (same quality as in Example 1) and 400 ml of 95% sulfuric acid in 3.2 liters of water, at a pH of 8; the precipitating time was 2 hours. The solid substance content was 37.8%, the Carman surface 27 $m^2/g$., the BET surface 57 $m^2/g$., and the electrolyte content 0.1%. $t_o$ was 34 sec., $t\frac{1000}{120}$ was 176 sec., and $t\frac{1000}{120}/t_o$ was 5.18.

COMPARISON EXAMPLE

In the same manner as in Example 2, but making use of 80 grams of anhydrous Na$_2$SO$_4$ as salt, silicic acid was precipitated with sulfuric acid. The $t_o$ of this silicic acid was 91 sec. and $t\frac{1000}{120}$ was 990 sec.

What is claimed is:

1. Process for the preparation of finely divided silicic acid particles, which are simultaneously suitable as a filtering auxiliary and as a stabilizing agent for beer in the filtration thereof, said silicic acid particles being of an essentially spherical or spheroidal shape and having an SiO$_2$ content of at least 95% by weight, said content being based upon said particles after drying at about 110° C., an Na$_2$O content of less than 0.25% by weight, and wherein the pH value of said particles comprising a 10% suspension in water is from about 4 to 7, said particles further having a surface according to Carman no greater than 100 m$^2$/g. and said particles having a standard test filtration time $t_o$ of 20 seconds to 6 minutes and a ratio of $t\frac{1000}{120}/t_o$ of about 0.7 to 6.5, with $t\frac{1000}{120}$ being the test filtration time after a stirring stress of 120 minutes at 1000 rpm, comprising forming an aqueous charge containing 0.4 to 2.0% dissolved common salt by weight, said charge being between 33% and 70% by volume of the final volume of said charge and said silicic acid after precipitation of particles of said silicic acid, and wherein said aqueous charge has added uniformly and separately thereto a sodium silicate solution and an acid to form a silicic acid suspension that contains said silicic acid, said sodium silicate solution being metered into said charge whereby the pH value in the charge is about 3 to 10 during the addition, the temperature of said charge being maintained between about 50° C. and 95° C. during said addition, adjusting the pH value of said silicic acid suspension to about 7 to 4 after termination of the addition, filtering said silicic acid, washing said silicic acid with water and immediately drying said silicic acid while avoiding elevated shear stresses, followed by screening said acid in the absence of grinding with the aid of a sieving device.

2. Process for the preparation of finely divided silicic acid particles, which are suitable simultaneously as a filtering auxiliary and as a stabilizing agent for beer in the filtration thereof, said silicic acid particles being of an essentially spherical or spheroidal shape and having an SiO$_2$ content of at least 99% by weight, said content being based upon said particles after drying at about 110° C., an Na$_2$O content less than 0.25% by weight, and wherein the pH value of said particles comprising a 10% suspension in water is from about 4 to 7, said particles further having a surface according to Carman no greater than 80 m$^2$/g, and said particles having a standard test filtration time $t_o$ of 20 seconds to 6 minutes and a ratio of $t\frac{1000}{120}/t_o$ of about 1.0 to 4.0, with $t\frac{1000}{120}$ being the test filtration time after a stirring stress of 120 minutes at 1000 rpm, $t\frac{1000}{120}$ having a value no greater than 10 minutes, wherein said particles are prepared by precipitation to form a dried mass and in the absence of grinding of said dried mass, comprising adding, uniformly and separately, to an aqueous charge containing 0.4 to 2.0% dissolved common salt by weight, said charge being between 33% to 70% by volume of the final volume of said charge and said silicic acid after precipitation of said silicic acid, a sodium silicate solution and an acid to form a silicic acid suspension that contains said silicic acid particles, said sodium silicate solution being metered into said charge whereby the pH value in the charge is about 3 to 10 during the addition, the temperature of said charge being maintained between about 50° C. and 95° C. during said addition, adjusting the pH value of said silicic acid suspension to about 7 to 4 after termination of the addition, filtering said silicic acid, washing said silicic acid with water and immediately drying said silicic acid while avoiding elevated shear stresses, followed by screening said acid in the absence of grinding with the aid of a sieving device.

3. Process pursuant to claim 2, wherein the volume of said charge is at least 50% by volume of the final volume of said charge and said silicic acid after precipitation of said silicic acid.

4. Process pursuant to claim 3, wherein said acid is sulfuric acid..

5. Process pursuant to claim 4, wherein said screening is accomplished with brush passing screens.

* * * * *